United States Patent
Goeke

(10) Patent No.: US 7,233,670 B2
(45) Date of Patent: Jun. 19, 2007

(54) SIGNAL TRACING SYSTEM AND METHOD

(75) Inventor: Maxime Goeke, Borex (CH)

(73) Assignee: Nagravision, S.A., Cheseaux-sur-Lausanne (CH)

( * ) Notice: Subject to any disclaimer, the term of this patent is extended or adjusted under 35 U.S.C. 154(b) by 741 days.

(21) Appl. No.: 10/469,039

(22) PCT Filed: Feb. 25, 2002

(86) PCT No.: PCT/IB02/00555

§ 371 (c)(1), (2), (4) Date: Aug. 26, 2003

(87) PCT Pub. No.: WO02/069635

PCT Pub. Date: Sep. 6, 2002

(65) Prior Publication Data

US 2004/0076297 A1    Apr. 22, 2004

(30) Foreign Application Priority Data

Feb. 26, 2001  (CH) .................................... 0345/01

(51) Int. Cl.
*H04N 1/44* (2006.01)
*H04N 1/56* (2006.01)
*H04N 1/58* (2006.01)

(52) U.S. Cl. ...................... 380/241; 380/209; 380/226

(58) Field of Classification Search ................ 380/209, 380/241, 226
See application file for complete search history.

(56) References Cited

U.S. PATENT DOCUMENTS

| 5,444,491 | A | * | 8/1995 | Lim .......................... 348/441 |
| 5,600,573 | A |   | 2/1997 | Hendricks et al. |
| 5,748,763 | A | * | 5/1998 | Rhoads ....................... 382/115 |
| 5,805,204 | A |   | 9/1998 | Thomson et al. |
| RE39,166  | E | * | 7/2006 | Gammie ..................... 380/228 |

FOREIGN PATENT DOCUMENTS

WO    WO9844735    10/1998

* cited by examiner

*Primary Examiner*—Gilberto Barron
*Assistant Examiner*—Venkat Perungavoor
(74) *Attorney, Agent, or Firm*—Harness, Dickey & Pierce, P.L.C.

(57) ABSTRACT

A system and a method are for determining the origin of a signal received by a pay television subscriber in a given region. A system includes an encryption device located at a main operator, a transmission device adapted to transmit an encrypted video signal towards at least one local operator, and a decryption device at the local operator. The decryption device includes an identification device for replacing all or part of the decrypted video signal with an identification signal characterising the decryption device.

23 Claims, 1 Drawing Sheet

SIGNAL TRACING SYSTEM AND METHOD

This application is the national phase under 35 U.S.C. § 371 of PCT International Application No. PCT/IB02/00555 which has an International filing date of Feb. 25, 2002, which designated the United States of America and which claims priority on Swiss Patent Application number CH 0345/01 filed Feb. 26, 2001, the entire contents of which are hereby incorporated herein by reference.

FIELD OF THE INVENTION

The present invention is generally of the field of information signal distribution by several intervening parties. More particularly, it is directed to determining, in an indisputable manner, the origin of the signal.

BACKGROUND OF THE INVENTION

In the case of a pay television broadcasting, several intervening parties cooperate so that the subscribers can receive the desired emissions.

Amongst these intervening parties we find firstly the main or national operators who offer the important television channels. It should be known that a same channel can be offered by more than one national operator. These national operators can either be the creators of this channel or they can sign broadcasting contracts with other local or foreign broadcasters. These national operators thus offer a service palette to local operators, the latter being connected to a certain number of subscribers.

A local operator can be active in several regions and the contracts binding this operator to a national operator are generally based on the number of subscribers to which the channel will be broadcasted or according to a geographical definition. Thus it is possible for a local operator to sign a broadcasting contract for a region A although this operator broadcasts also in regions B and C. Then it exists technically a possibility for this operator to also broadcast in the regions B and C without the national operator being able to intervene.

This is particularly the case in the case that the illegally broadcasted channel in the region B is also offered by another national operator through another local broadcaster. It is then difficult for the main operator to know if the signal received in the region B comes from a contract signed only for the region A or if it comes from another national operator. In fact, each subscriber can be connected to more than one local operator, the latter being supplied by many national operators.

It is well known that the national operators transmit their signals to the local operators in encrypted form. For the decryption operation, decryption devices are supplied by the national operator. These devices can include a decryption module and a smart card, the latter being in charge of ensuring the access control. Once the signal is decrypted by the decryption device, the local operator can dispose of it as it likes. It is then allowed for the local operator to compose its television bouquet with a selection of channels subscribed from several national operators.

SUMMARY OF THE INVENTION

An aim of an embodiment of the present invention is to propose a system and a method for determining the origin of the signal received by a subscriber in a given region.

An objective my be achieved by a system comprising encryption means located at a main operator, transmission means of an encrypted video signal towards at least one local operator, and decryption means at the local operator, wherein the decryption means comprise identification means replacing all or part of the decrypted video signal with an identification signal characterising the decryption means.

An identification signal includes a visual signature added to any region of the screen. It can have the form of a text field at the bottom of the screen, a background overlaying the real image, etc. When this signal is added to the video signal, all the subscribers to whom the channel is broadcasted will see an identification message appear on their screens.

In order to be able to trace the origin of the data transmitted to a subscriber this message will contain an identifier specific to the decryption device responsible for the decryption of the main operator's signal. The latter may thus prove that the channel available for any given subscriber is the result of its transmission towards a given local operator.

According to our previous example, a subscriber of the region B serves as a test to determine if the contract with the local operator has been respected. If the identification message appears on his/her screen the local operator has not respected its contract that was limited to the region A.

BRIEF DESCRIPTION OF THE DRAWINGS

Embodiments of the invention will be better understood with the help of the following detailed description which refers to the annexed figure which is given as a non-limiting example.

The single figure represents a system of pay television broadcasting with several intervening parties.

DETAILED DESCRIPTION OF THE PREFERRED EMBODIMENTS

Figure 1:
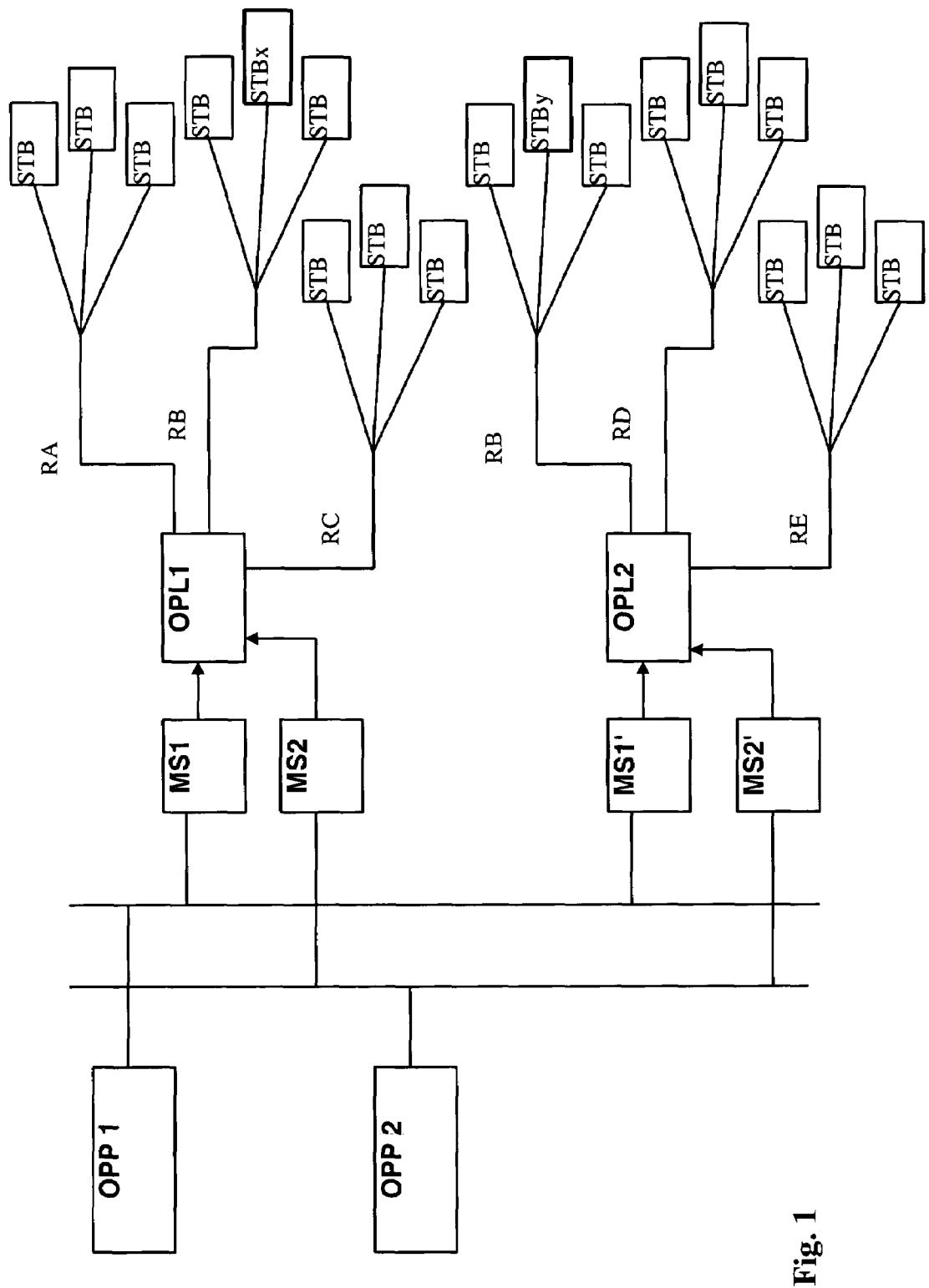

On the left of the figure are two main operators OPP1 and OPP2. These operators propose their broadcasting channels to all the local operators represented by OPL1 and OPL2.

The link between the main operators and the local ones is done by example by satellite or by cable. Many local operators can receive these signals and due to this it is necessary to encrypt the data in order to control the use.

To this effect a decryption module MS is placed at the local operator and is in charge of decrypting the signal encrypted by the main operator. This module has the form of a pay television decoder and is linked to a security module that has the form of a smart card. This card contains the keys that are necessary for the functioning of the cryptographic processor contained in the decryption module.

In this way, each main operator that sings an agreement with a local operator also installs such a decryption module MS in the premises of the local operator. The signal coming out of the decryption module MS is in plaintext and no other control at that stage can be carried out by the main operator.

The local operator composes its offer, which is an assembly of several channels acquired from several main operators (OPP1, OPP2), and encrypts it according to a protocol and means that are specific to it. This new signal is then broadcasted by different ways, for example by cable or by radio-relay network, to the target regions (RA, RB, RC) of this operator. At the subscriber's end there is the final decoder (STB) in charge of decrypting the signal of the local operator.

According to our example of FIG. 1, the region B (RB) is supplied by two local operators either the operator OPL1 and OPL2.

The main operator OPP1 signs a broadcasting agreement of channel S with the operator OPL1 for the region A (RA). It should be noted that this channel is equally proposed by the main operator OPP2 that sings an agreement with a local operator OPL2 for the region E (RE).

In the case where the channel S is also broadcasted in the region B, it is difficult for the main operator OPP1 to know if a decoder STB receives the channel S from the operator OPL1 or from OPL2, the latter also being able to broadcast in other regions the channel S. Furthermore, it may happen that the decoders STBy and STBx are in fact the same decoder, the latter having the subscription rights from both local operators.

This configuration is even more complicated by the fact that the local operator OPL2 can sign a broadcasting agreement for the region B either with the operator OPP1 or with the operator OPP2. The simple fact of adding a logo on the signal broadcasted by a main operator does not allow to determine if the agreements for each region are being respected. This is why, according to an embodiment of the invention, the main operator OPL1 sends a command to the decryption module MS1 so that a signal identifying this module is added to the screen of the decoders that receive the signal issued from this decryption module MS1.

This identification generally includes the identification number of the decryption module and the number of the security module (smart card). In this way these numbers prove indisputably the origin of the channel S from a decoder for a given region. This identification lasts several seconds in order not to disturb the subscriber.

This duration can be managed either by the decryption module itself or by a command sent by the main operator to deactivate this function.

According to a first embodiment, this signal replaces the bottom part of the image with these indications of alphanumeric type.

The region modified by this information can be randomly chosen to prevent the local operator from detecting the identification mode and from replacing the corresponding part with an advertisement text.

According to a second embodiment, the identification data are added in the background on the image. It is then impossible for the local operator to hide this information.

According to one embodiment the command sent by a main operator is called global, that is that it makes react all the decryption modules (MS1, MS1'). According to another embodiment the command sent by a main operator is called selective, that is that it makes react only the decryption module that is called.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. System for identifying an origin of a signal broadcasted to a subscriber, comprising:
   an encryption device located at a main operator;
   a transmission device, adapted to transmit an encrypted video signal towards at least one local operator; and
   a decryption device located at the at least one local operator, adapted to provide the local operator with a decrypted signal for broadcasting to subscribers, wherein the decryption device includes a substitution device, adapted to replace at least part of the decrypted video signal with an identification signal characterising the decryption device.

2. System for identifying the origin of signal according to claim 1, wherein the decryption device includes a decryption module and a security module.

3. System for identifying the origin of a signal according to claim 2, wherein the identification signal includes an identifier of the decryption module and an identifier of the security module.

4. System for identifying the origin of a signal according to claim 1, wherein the identification signal is placed in a randomly defined area on a screen.

5. System for identifying the origin of a signal according to claim 1, wherein the identification signal is overlaying a current image such as a background.

6. Method for identifying the origin of a signal broadcasted to a subscriber, the method comprising:
   encrypting a video signal by a main operator;
   transmitting the encrypted signal to several local operators;
   decrypting the encrypted signal by a decryption module of an enabled local operator and disposing of the decrypted signal; and,
   broadcasting of the decrypted signal to subscribers of said local operator,
   wherein:
   at least part of the decrypted signal is substituted with an identification signal identifying the decryption module prior to broadcasting.

7. Method according to claim 6, wherein the identification signal replaces a part of an image formed by the decrypted signal in any region of the image.

8. Method according to claim 6, wherein the identification signal is overlaying a current image such as a background.

9. A method according to claim 6, wherein an identification command by the main operator is to at least one decryption module.

10. System for identifying an origin of a signal broadcasted to a subscriber, comprising:
    transmission means for transmitting an encrypted video signal towards at least one local operator; and
    decryption means, located at the at least one local operator, for providing the local operator with a decrypted signal for broadcasting to subscribers, wherein the decryption means includes substitution means for replacing at least part of the decrypted video signal with an identification signal characterising the decryption means.

11. System for identifying the origin of a signal according to claim 10, wherein the decryption means includes a decryption module and a security module.

12. System for identifying the origin of a signal according to claim 11, wherein the identification signal includes an identifier of the decryption module and an identifier of the security module.

13. System for identifying the origin of a signal according to claim 10, wherein the identification signal is placed in a randomly defined area on a screen.

14. System for identifying the origin of a signal according to claim 10, wherein the identification signal is overlaying a current image such as a background.

15. An apparatus, comprising:
a decryption device associated with a local operator, adapted to decrypt a previously encrypted video signal transmitted toward the local operator, to produce a decrypted signal for broadcasting to subscribers, wherein the decryption device includes a substitution device, adapted to replace at least part of the decrypted video signal with an identification signal characterising the decryption device.

16. An apparatus according to claim 15, wherein the decryption device includes a decryption module and a security module.

17. An apparatus according to claim 16, wherein the identification signal includes an identifier of the decryption module and an identifier of the security module.

18. An apparatus according to claim 15, wherein the identification signal is placed in a randomly defined area on a screen.

19. An apparatus according to claim 1, wherein the identification signal is overlaying the current image such as a background.

20. A method, comprising:
decrypting a received previously encrypted signal using a decryption module associated with an enabled local operator; and
broadcasting the decrypted signal to at least one subscriber of the local operator, wherein at least part of the decrypted signal is substituted with an identification signal identifying the decryption module prior to broadcasting.

21. A method according to claim 20, wherein the identification signal replaces a part of the image formed by the decrypted signal in any region of the image.

22. A method according to claim 20, wherein the identification signal is overlaying the current image such as a background.

23. A method according to claim 20, wherein an identification command by a main operator is to at lest one decryption module.

* * * * *